Sept. 16, 1947.　　　　S. L. FULLER　　　　2,427,595
CONTROL SWITCH FOR DIRECTION SIGNALS OF MOTOR VEHICLES
Filed Sept. 10, 1945　　　　2 Sheets-Sheet 1
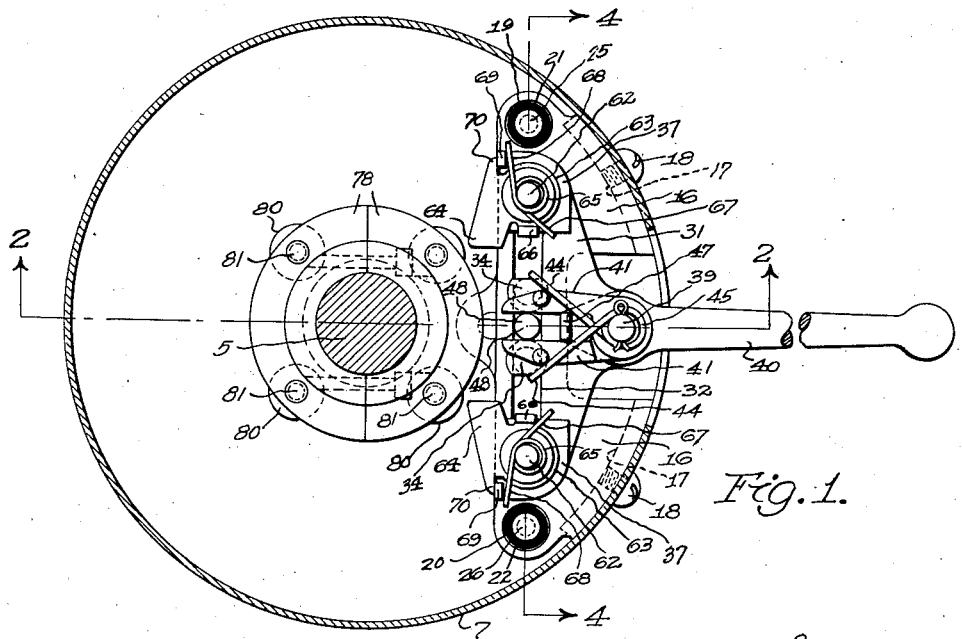
Fig.1.
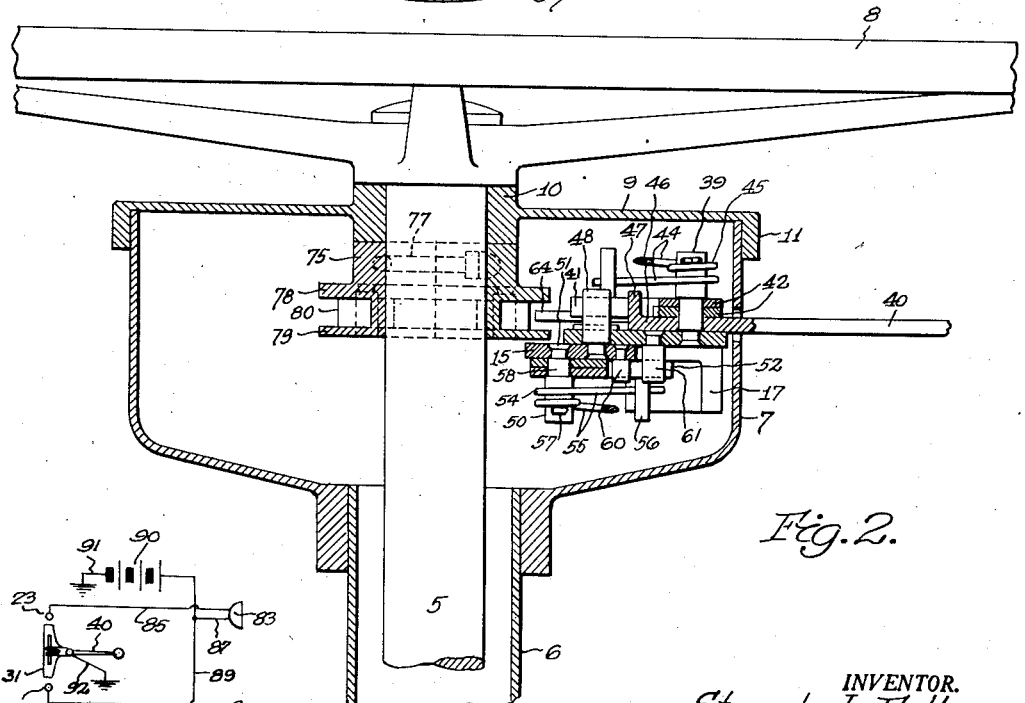
Fig.2.
Fig.7.
INVENTOR.
Stuart L. Fuller
BY Barthel & Bugbee
ATT'Ys Sept. 16, 1947. S. L. FULLER 2,427,595
CONTROL SWITCH FOR DIRECTION SIGNALS OF MOTOR VEHICLES
Filed Sept. 10, 1945 2 Sheets-Sheet 2
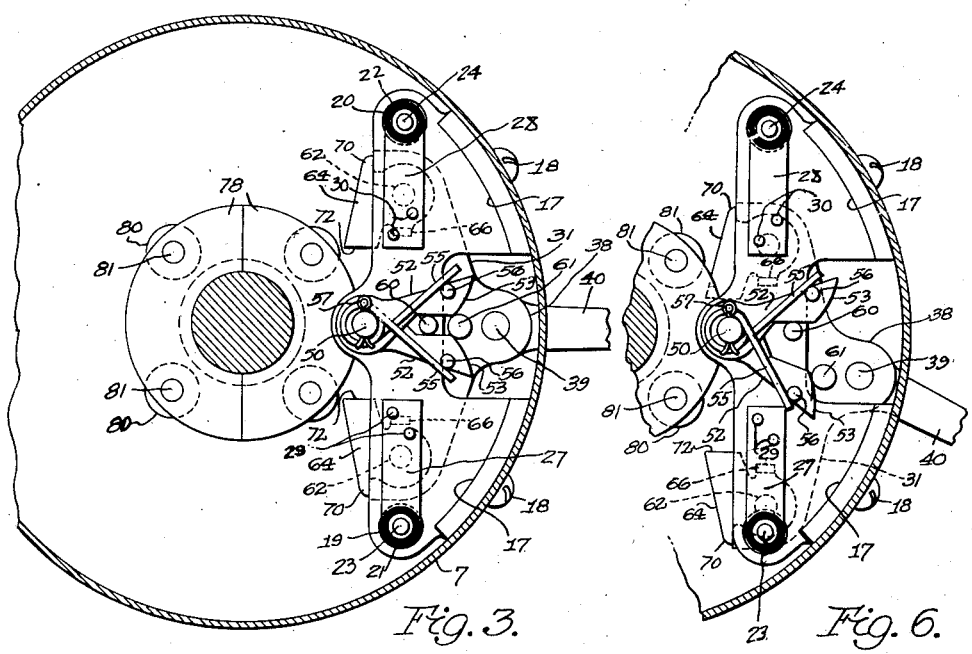
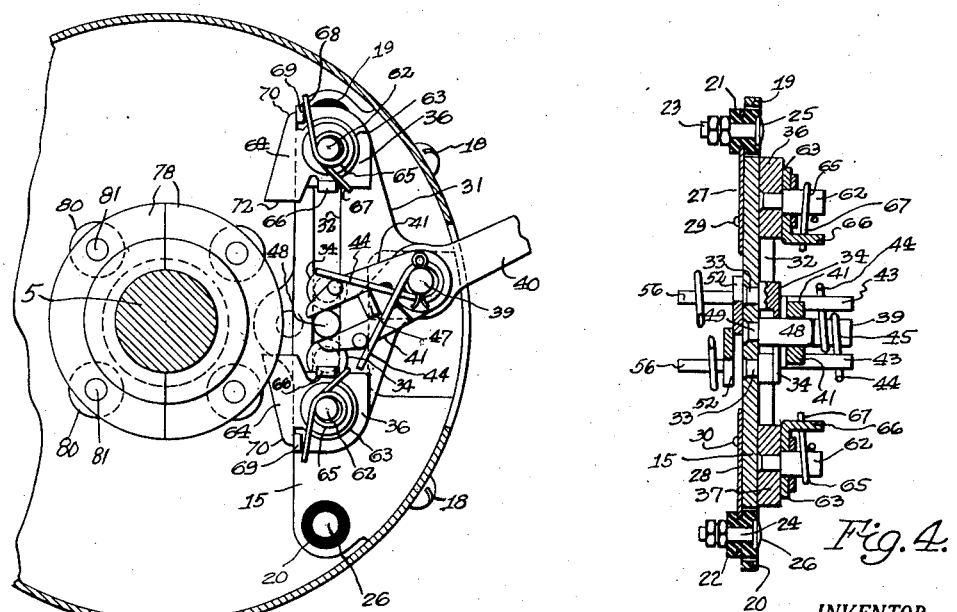
INVENTOR.
Stuart L. Fuller
BY Barthel + Bugbee
ATT'YS Patented Sept. 16, 1947

2,427,595

UNITED STATES PATENT OFFICE 2,427,595

CONTROL SWITCH FOR DIRECTION SIGNALS OF MOTOR VEHICLES

Stuart L. Fuller, Royal Oak, Mich.

Application September 10, 1945, Serial No. 615,476

8 Claims. (Cl. 200—59)

The present invention relates to electrical circuit makers and breakers for controlling right and left turn signals of motor vehicles and more particularly to a manually controlled switch within easy reach of the operator of said motor vehicle.

The primary object of the invention is to provide a manually controlled circuit maker and breaker having a control arm adapted to be operated by the driver of a motor vehicle to electrically energize a corresponding visible direction signal and thereby warn a following motorist of the intentions of the driver to turn to the right or left.

Another object of the invention is to provide a circuit maker and breaker for direction indicating signals of motor vehicles which may be manually set by the driver of said vehicle to give a visible signal of the intended direction of turning and which may be restored to its neutral position after the turn has been negotiated and when the steering mechanism has been returned to steer the vehicle in a straight line path.

Another object of the invention is to provide a switch mechanism for selectively energizing the direction signals of motor vehicles which is entirely fool-proof and is arranged so as not to cause confusion in the mind of the driver or operator in giving the proper signals for intended right and left-hand turns.

Another object of the invention is to provide a switch mechanism of the above-mentioned character in which the manual selective control lever is yieldingly connected to the movable switch member in such a manner as to prevent breakage thereof should the switch parts be in such a position as to prevent movement of the movable switch member when the selective control lever is operated, thereby eliminating breakage of the selective control lever as well as the other parts of the switch mechanism.

Another object of the invention is to provide a selective control switch for the visible direction signals of motor vehicles which when turned in a right or left-hand direction to energize a corresponding direction signal will be restored to its neutral position by anti-friction rollers carried by the steering column when the steering mechanism is returned to steer the vehicle in a straight-line path.

Another object of the invention is to provide a switch mechanism which may be set to give a visible indication of the intended direction of turning and which will remain in a pre-selected position while the vehicle is being steered to the right or left so as to avoid confusion in the mind of the operator of a following vehicle. The switch mechanism is returned to a neutral position only when the steering wheel is reversely turned to guide the vehicle along a straight-line path.

Another object of the invention is to provide a switch mechanism for selectively controlling direction signals for motor vehicles in which the control arm is adapted to be moved in the direction of steering wheel movement to give a corresponding signal of the intended direction of turning and to provide the steering arm with means for holding the same in position until after the turn has been negotiated.

Another object of the invention is to provide a selective control lever for a switch mechanism of the type above mentioned which is provided with resilient means for holding the control lever in a normal neutral position.

Other objects and advantages of the invention will become apparent during the course of the following description of the accompanying drawings, wherein:

Figure 1 is a horizontal cross-sectional view of the control lever for a switch mechanism of the type above mentioned which is provided with resilient means for holding the control lever in a normal neutral position;

Figure 2 is a vertical sectional view taken on line 2—2 of Figure 1 looking in the direction of the arrows and further showing the arrangement of the several switch parts and the manner in which the same are related and associated with the steering column of a motor vehicle;

Figure 3 is a horizontal cross-sectional view taken through the steering column and showing the switch mechanism in bottom elevation with the control lever in a neutral position;

Figure 4 is a vertical sectional view taken on line 4—4 of Figure 1 looking in the direction of the arrows to illustrate the various switch parts in detail;

Figure 5 is a horizontal cross-sectional view of the steering column showing the control switch in top elevation illustrating the selective control lever moved to a position when making a left-hand turn;

Figure 6 is a similar view showing the switch parts in bottom plan view and the control lever in substantially the same position as shown in Figure 5; and Figure 7 is a diagrammatic view of the wiring system between the control switch and the visible indicating direction lights.

In the drawing there is shown a steering column 5 of the usual construction mounted in a tubular housing 6 and having an enlarged casing 7 secured to the upper portion thereof. The steering assembly constitutes the usual construction of automobile steering gear control, and secured to the top of the steering column 5 is a steering wheel 8 keyed to the steering shaft column 5 and locked thereto in the usual manner. The enlarged housing 7 is provided with a cover 9, the hub of which as at 10 is mounted on the steering column 5 in such a manner as to permit free rotation of the steering column or shaft without disturbing the cover 9. The marginal edge of the cover 9 is provided with an annular flange 11 which may be threaded on the upper end of the housing 7 to securely hold the same in place.

The invention comprises a novel switch mechanism which is adapted to be mounted within the housing 7 to be manually operated to one of two selective positions and to be restored to a neutral position upon movement of the steering shaft 5.

The switch mechanism includes a sector-shaped plate 15 having wing portions 16 provided with arcuately curved segments 17 shaped to conform to the contour of the housing 7 so as to be affixed thereto by machine screws or the like as at 18. The ends of the switch plate 15 are provided with openings 19 and 20 for receiving rubber bushings 21 and 22 or other suitable insulating material, for supporting stationary switch contact members 23 and 24. The switch contact members are provided with enlarged heads 25 and 26 respectively and are held in place within the openings 19 and 20 by means of yielding spring arms 27 and 28, which are fastened to the underside of the switch plate by rivets 29 and 30. The insulating bushings 21 and 22 are provided with annular grooves to anchor the bushings in openings in the yielding spring arms 27 which are slightly smaller in diameter than the diameter of the insulating bushings 21 and 22.

Slidably mounted on the switch plate 15 is a movable contact plate 31 which is provided with an enlongated slot 32 to facilitate sliding movement of said plate 31 upon a pair of spaced pins 33 having enlarged heads 34. The enlarged heads 34 are of a diameter greater than the width of the slot 32 to prevent displacement of the movable switch plate 31 but yet permit longitudinal sliding movement thereof.

It is to be noted that the movable switch plate 31 may thus slide to and fro on the switch plate 15 so that the ends thereof will alternately engage the stationary contact pins 25 and 26. The opposite ends of the sliding switch contact plate 31 are enlarged as at 36 and 37 to provide relatively large switch surfaces for wiping contact with the enlarged head and stationary contact pins 25 and 26.

The movable switch contact plate 31 is provided with a central projection 38 having an upstanding pin 39 to which is pivoted a manually controlled switch operating lever 40. Also pivotally mounted on the upstanding pin 39 is a pair of yielding pressed levers 41 which are provided with hub portions 42 mounted for free swinging movement on the pin 39. The ends of the lever 41 are provided with upstanding pins 43 for being engaged by the free ends 44 of a spring member which is coiled about the pin 39 as at 45. The selective control lever 40 is formed with an extension 46 and an upstanding lug 47 which is adapted to pass between the yielding spring levers 41 to hold the levers 41 separated so as to form a slot therebetween and receive a fulcrum pin 48 which has one end anchored to the switch plate 15 as at 49 (Figure 4). Thus, when the control lever 40 is moved to and fro, the movable switch contact plate 31 will likewise move to and fro and alternately engage the enlarged heads of the stationary switch contacts 23 and 24. If the control arm 40 is moved a distance greater than the longitudinal movement of the movable contact plate 31, the yielding spring-pressed levers 41 will swing against the action of the spring arm 44 and permit movement of the control lever 40 relative to the movable switch contact plate 31.

Depending from the underside of the switch plate 15 is a pin 50 which is anchored in place by being upset or riveted to the switch plate 15 as at 51. Pivotally mounted on the depending pin 50 is a pair of oppositely swinging lever arms 52 which terminate at their outer ends in pointed portions having friction surfaces 53. A wire spring member is coiled about the pin 50 as at 54 so that the free ends 55 thereof will engage pins 56 depending from the underside of said lever arms 52. A cotter key or pin 57 is passed through a transversely extending opening through the pin 50 to secure the spring in place and the hub portions of the lever arms 52 are mounted on the slightly reduced portion 58 of the depending pin 50 to likewise hold the lever arms in position but yet permit free swinging movement thereof. Also depending from the underside of the switch plate 15 is a pin 60 which is riveted or otherwise fastened in place and is positioned to hold the lever arm 52 in spaced apart relation (Figure 3). Similarly depending from the movable contact switch plate 31 is a pin 61 which is adapted to be normally held between the points of convergence of the arcuately curved surfaces 53 on the free ends of the lever arms 52 so as to hold the movable contact switch plate in a neutral or central position and simultaneously lock the movable switch contact plate in one of its adjusted positions. That is to say, when the selective control arm 40 is moved to give a signal for a right or left-hand turn, the depending pin 51 on the movable contact plate will engage either one of the arcuately curved surfaces 53 and through the frictional engagement therewith will retain the selective control arm and movable contact switch plate 31 in its preselected position until the steering wheel has been turned to restore the movable contact switch arm 31 and selective control lever 40 to its neutral position in a manner which will be hereinafter more fully described.

The ends of the movable contact switch plate 31 are provided with upstanding pins 62 to each of which is pivotally attached the hub portion 63 of a pivoted detent or dog 64. A coil spring 65 is provided for each of the upstanding pins 62 and is coiled thereabout so that one end of the coil spring as at 67 may engage a detent 66 on the hub 63 of the pivoted dogs 64. The other ends 68 of the coil springs 65 are adapted to engage an upstanding lug 69 at each end of the movable switch contact plate 31. Extensions 70 are formed on the dogs or detents 64 to engage the upstanding lugs 69 so that the force of the coil spring 65 will exert a pressure on the detent 64 to hold the extension 70 against the upstanding stop lugs 69. The ends of the detents or dogs 64 are provided with flat surfaces 72 which are normally arranged in parallelism and are spaced as shown in Figures 1, 3, 5 and 6. Cotter keys or the like may be passed through the pins 62 to retain the coil spring 65 in place so that when said detents or dogs 64 are partially rotated about the pivot pins 62, the coil spring detent will not be removed therefrom. With the arrangement as shown, it will readily be seen that the dogs or detents 64 are free to swing under the yielding action of the coil spring 65 and that the rotational movement thereof is limited by the stop lugs 69.

Mounted on the steering shaft 5 is a divided collar comprising semi-circular sections 75 and 76 which are adapted to be clamped to the steering shaft 5 by means of diametrically disposed clamping bolts 77. Each of the semi-circular sections 75 and 76 of the divided collar is formed with a pair of spaced flanges 78 and 79 to provide an annular recess for receiving a series of rollers or the like as at 80. The rollers are fastened in place by circumferentially spaced pins 81 extending through the flanges 78 and 79 and said pins may be anchored against displacement by being upset at the ends thereof.

The control switch is placed in circuit with the right and left-hand direction signals of the motor vehicle and as shown in Figure 7, the left-hand direction signal is indicated by the reference character 83 and the right-hand signal by the reference character 84. The signals 83 and 84 may be mounted in a single lamp housing having direction arrows pointing to the right and left so that when the selective control lever 40 is shifted from its neutral position in a clockwise direction with the direction of steering wheel rotation for steering the vehicle to the right, the signal indicator 84 will be energized thereby giving a visible signal to following motorists of the intended direction of turn. It is to be noted that the stationary contact pins 23 and 24 are in circuit with the visible signal indicators 83 and 84 respectively by single lead lines or conductors 85 and 86 and that the other terminals 87 and 88 of the visible signal indicators 83 and 84 are connected by a lead wire 89 to the storage battery of the vehicle as at 90. The other terminal of the storage battery is grounded to the vehicle body by means of the lead wire 91 and similarly, the movable switch plate 31 is grounded to the frame of the motor vehicle by means of the lead wire 92. It will thus be seen that when the control lever 40 is moved in a clockwise or counterclockwise direction to give respectively right or left signals, the illuminated signal indicators 83 and 84 will be energized accordingly.

*Description of the operation*

It will be assumed that the switch structure is affixed to the steering mechanism and mounted in the housing 7 so that the rollers 80 are in the same horizontal plane as the detents or dogs 54 and that the electrical contacts of the switch structure are connected as shown in Figure 7 and that the movable switch plate 31 is grounded through the steering column housing 6 to the frame of the vehicle. It will also be assumed that the driver of the vehicle desires to make a right hand turn. Before the driver approaches the turn or street intersection upon which the turn is to be made, the electrical control lever 40 is moved in a clockwise direction. This causes the right-hand turn signal 83 which may be conveniently located on the back of the vehicle, to be energized when the movable switch contact plate 31 engages the stationary contact 23. The driver then turns the steering wheel 8 in a clockwise direction to negotiate the turn and after the turn has been made, the driver may rotate the steering wheel 8 in a counterclockwise direction to steer the vehicle along a straight-line path. When opposite rotation is imparted to the steering shaft 5 by the steering wheel 8 to steer the vehicle along a straight-line path, one of the rollers 80 will engage the flat surface 72 of the lowermost dog or detent 64 and thereby restore the movable switch plate 31 to its neutral position where it will be held by the yielding action of the pivoted lever 52 engaging the pin 61.

When it is desired to make a left-hand turn, the selective control lever 40 is shifted in a counterclockwise direction so as to cause the movable contact plate 31 to engage the stationary contact 24 and thereby complete the circuit through the lead wire 86, left-hand signal indicator 84, lead wires 88 and 89 and thence to the storage battery 90. The circuit is completed through the ground connections 91 and 92 through the frame structure of the vehicle. After the driver has negotiated the turn and rotates the steering wheel 8 in a clockwise direction, the other of said detents 64 will be engaged by one of the rollers 80 to again restore the movable switch contact plate 31 to its neutral position.

In both instances, or while making a right or left-hand turn and shifting the selective control lever 40, it will be noted that the control lever 40 is frictionally held in its preselected position by means of the pin 61 engaging one or the other of the arcuately curved friction surfaces 53 on the ends of the resiliently urged pivoted levers 52. Thus, the movable contact switch plate 31 and control lever 40 will remain in the position of initial movement until restored to a neutral position by one of the rollers 80 engaging one of the dogs or detents 64.

Should the driver of the vehicle exert excessive force on the selective control lever 40 to such an extent as to move the same beyond the linear movable distance of the switch contact plate 31, the arms 41 will yield and permit further movement of the selective control lever 40 without causing damage or breakage of the selective control lever as well as breakage of the various parts of the control switch. Also, it is to be noted that should the steering shaft 5 be in a position so that one of the rollers 80 is disposed in the path of one of the detents 64, movement of the selective control lever 40 will be permitted without effecting movement of the movable contact plate 31. In other words, should the movable switch plate 31 be prevented for any reason from moving while making a signal with the selective control lever, the lever 40 will move under the yielding action of the spring arms 44 without moving the movable switch plate 31 so that damage thereto will be prevented.

It is further to be noted that when the movable switch plate 31 has been shifted to a selected position and the driver turns the steering column 5 by means of the steering wheel 8 in the direction of intended turn, the rollers 80 will click past the dogs or detents 64 without effecting movement of the movable switch contact plate 31. It is only when the steering shaft 5 is moved in a reverse direction to the direction for which the signal has been given that the rollers 80 will engage the detents 64 to restore the switch plate 31 to its neutral position.

It is to be understood that the form of the invention herewith shown and described is to be taken as a preferred embodiment thereof and that various changes may be made in the shape, size and arrangement of parts without departing from the spirit of the invention or the scope of the subjoined claims.

What I claim is:

1. In a direction signalling system for a vehicle with a steering column and a steering shaft mounted in said column for reverse rotation in directions to steer to the right or left, a control switch comprising a collar mounted on said steering shaft, a series of circumferentially spaced rollers carried by said collar to rotate about the axis of said steering shaft, a base affixed to said steering column and arranged adjacent said collar, a pair of fixed switch contacts mounted on said base, a switch contact plate mounted on said base for longitudinal sliding movement to alternately engage said fixed switch contacts, detents mounted on the ends of said switch contact plate, yielding spring means for holding said detents in position for being engaged by said rollers, and a selective control lever associated with said movable switch contact plate and movable about a pivotal axis in the same direction as the movement of the steering shaft for making a turn, whereby one of said detents will be positioned in the path of said rollers when the steering shaft is rotated in a reverse direction to restore the movable switch contact plate to a neutral position.

2. In a direction signalling system for a vehicle with a steering column and a steering shaft mounted in said column for reverse rotation in directions to steer to the right or left, a control switch comprising a collar mounted on said steering shaft, a series of circumferentially spaced rollers carried by said collar to rotate about the axis of said steering shaft, a base affixed to said steering column and arranged adjacent said collar, a pair of fixed switch contacts mounted on said base, a switch contact plate mounted on said base for longitudinal sliding movement to alternately engage said fixed switch contacts, detents mounted on the ends of said switch contact plate, yielding spring means for holding said detents in position for being engaged by said rollers, a selective control lever associated with said movable switch contact plate and movable about a pivotal axis in the same direction as the movement of the steering shaft for making a turn, whereby one of said detents will be positioned in the path of said rollers when the steering shaft is rotated in a reverse direction to restore the movable switch contact plate to a neutral position, and yielding means connecting said selective control lever to said movable switch plate arranged to permit movement of said selective control lever relative to said movable contact switch plate should one of the rollers on said collar be in the path of one of the detents such as to obstruct free movement thereof.

3. In a direction signalling system for a vehicle with a steering column and a steering shaft mounted in said column for reverse rotation in directions to steer to the right or left, a control switch comprising a collar mounted on said steering shaft, a series of circumferentially spaced rollers carried by said collar to rotate about the axis of said steering shaft, a base affixed to said steering column and arranged adjacent said collar, a pair of fixed switch contacts mounted on said base, a switch contact plate mounted on said base for longitudinal sliding movement to alternately engage said fixed switch contacts, detents mounted on the ends of said switch contact plate, yielding spring means for holding said detents in position for being engaged by said rollers, a selective control lever associated with said movable switch contact plate and movable about a pivotal axis in the same direction as the movement of the steering shaft for making a turn, whereby one of said detents will be positioned in the path of said rollers when the steering shaft is rotated in a reverse direction to restore the movable switch contact plate to a neutral position, and means for frictionally retaining said selective control lever in a preselected position until one of the detents is engaged by one of the rollers to restore the movable switch plate to its neutral position.

4. In a direction signalling system for a vehicle with a steering column and a steering shaft mounted in said column for reverse rotation in directions to steer to the right or left, a control switch comprising a collar mounted on said steering shaft, a series of circumferentially spaced rollers carried by said collar to rotate about the axis of said steering shaft, a base affixed to said steering column and arranged adjacent said collar, a pair of fixed switch contacts mounted on said base, a switch contact plate mounted on said base for longitudinal sliding movement to alternately engage said fixed switch contacts, detents mounted on the ends of said switch contact plate, yielding spring means for holding said detents in position for being engaged by said rollers, a selective control lever associated with said movable switch contact plate and movable about a pivotal axis in the same direction as the movement of the steering shaft for making a turn, whereby one of said detents will be positioned in the path of said rollers when the steering shaft is rotated in a reverse direction to restore the movable switch contact plate to a neutral position, and yielding means for holding said movable switch plate and said selective control lever in a neutral position.

5. In a direction signalling system for a vehicle with a steering column and a steering shaft mounted in said column for reverse rotation in directions to steer to the right or left, a control switch comprising a collar mounted on said steering shaft, a series of circumferentially spaced rollers carried by said collar to rotate about the axis of said steering shaft, a base affixed to said steering column and arranged adjacent said collar, a pair of fixed switch contacts mounted on said base, a switch contact plate mounted on said base for longitudinal sliding movement to alternately engage said fixed switch contacts, detents mounted on the ends of said switch contact plate, yielding spring means for holding said detents in position for being engaged by said rollers, and a selective control lever associated with said movable switch contact plate and movable about a pivotal axis in the same direction as the movement of the steering shaft for making a turn, whereby one of said detents will be positioned in the path of said rollers when the steering shaft is rotated in a reverse direction to restore the movable switch contact plate to a neutral position, said detents being provided with roller engaging faces arranged in opposed parallel relation and extending tangentially to the peripheral surface of the steering shaft whereby when said switch plate has been shifted to give a direction signal, engagement of said detents by said rollers during rotation in one direction of said steering shaft will move said movable contact switch plate longitudinally to restore the same to a neutral position while movement of said rollers in an opposite direction will move the detents against the yielding action of said spring means without moving said movable switch contact plate.

6. In a direction signalling system for a vehicle with a steering column and a steering shaft mounted in said column for reverse rotation in directions to steer to the right or left, a control switch comprising a collar mounted on said steering shaft, a series of circumferentially spaced rollers carried by said collar to rotate about the axis of said steering shaft, a base affixed to said steering column and arranged adjacent said collar, a pair of fixed switch contacts mounted on said base, a switch contact plate mounted on said base for longitudinal sliding movement to alternately engage said fixed switch contacts, detents mounted on the ends of said switch contact plate, yielding spring means for holding said detents in position for being engaged by said rollers, a selective control lever associated with said movable switch contact plate and movable about a pivotal axis in the same direction as the movement of the steering shaft for making a turn, whereby one of said detents will be positioned in the path of said rollers when the steering shaft is rotated in a reverse direction to restore the movable switch contact plate to a neutral position, yielding means connecting said selective control lever to said movable switch plate arranged to permit movement of said selective control lever relative to said movable contact switch plate should one of the rollers on said collar be in the path of one of the detents so as to obstruct free movement thereof, and means for frictionally retaining said selective control lever in a preselected position until one of the detents is engaged by one of the rollers to restore the movable switch plate to its neutral position.

7. In a direction signalling system for a vehicle with a steering column and a steering shaft mounted in said column for reverse rotation in directions to steer to the right or left, a control switch comprising a collar mounted on said steering shaft, a series of circumferentially spaced rollers carried by said collar to rotate about the axis of said steering shaft, a base affixed to said steering column and arranged adjacent said collar, a pair of fixed switch contacts mounted on said base, a switch contact plate mounted on said base for longitudinal sliding movement to alternately engage said fixed switch contacts, detents mounted on the ends of said switch contact plate, yielding spring means for holding said detents in position for being engaged by said rollers, a selective control lever associated with said movable switch contact plate and movable about a pivotal axis in the same direction as the movement of the steering shaft for making a turn, whereby one of said detents will be positioned in the path of said rollers when the steering shaft is rotated in a reverse direction to restore the movable switch contact plate to a neutral position, yielding means connecting said selective control lever to said movable switch plate arranged to permit movement of said selective control lever relative to said movable contact switch plate should one of the rollers on said collar be in the path of one of the detents so as to obstruct free movement thereof, means for frictionally retaining said selective control lever in a preselected position until one of the detents is engaged by one of the rollers to restore the movable switch plate to its neutral position, and yielding means for holding said movable switch plate and said selective control lever in a neutral position.

8. In a direction signalling system for a vehicle with a steering column, and steering shaft mounted in said column for reverse rotation in directions to steer to the right or left, a control switch comprising a collar mounted on said steering shaft, a series of circumferentially spaced rollers carried by said collar to rotate about the axis of said steering shaft, a base affixed to said steering column and arranged adjacent said collar, a pair of fixed switch contacts mounted on said base, a switch contact plate mounted on said base for longitudinal sliding movement to alternately engage said fixed switch contacts, detents mounted on the ends of said switch contact plate, yielding spring means for holding said detents in position for being engaged by said rollers, a selective control lever associated with said movable switch contact plate and movable about a pivotal axis in the same direction as the movement of the steering shaft for making a turn, whereby one of said detents will be positioned in the path of said rollers when the steering shaft is rotated in a reverse direction to restore the movable switch contact plate to a neutral position, yielding means connecting said selective control lever to said movable switch plate arranged to permit movement of said selective control lever relative to said movable contact switch plate should one of the rollers on said collar be in the path of one of the detents so as to obstruct free movement thereof, means for frictionally retaining said selective control lever in a preselected position until one of the detents is engaged by one of the rollers to restore the movable switch plate to its neutral position, and yielding means for holding said movable switch plate and said selective control lever in a neutral position, said detents being provided with roller engaging faces arranged in opposed parallel relation and extending tangentially to the peripheral surface of the steering shaft whereby when said switch plate has been shifted to give a direction signal, engagement of said detents by said rollers during rotation in one direction of said steering shaft will move said movable contact switch plate longitudinally to restore the same to a neutral position while movement of said rollers in an opposite direction will move the detents against the yielding action of said spring means without moving said movable switch contact plate.

STUART L. FULLER.

REFERENCES CITED

The following references are of record in the file of this patent:

UNITED STATES PATENTS

| Number | Name | Date |
|---|---|---|
| 1,450,930 | Walter | Apr. 10, 1923 |
| 2,090,101 | Bonham | Aug. 17, 1937 |
| 2,296,585 | Tobias | Sept. 22, 1942 |